United States Patent [19]
Hayashi

[11] 3,722,824
[45] Mar. 27, 1973

[54] AUTOMATIC LOCKING DEVICE FOR A SAFETY BELT IN A MOTOR CAR

[75] Inventor: Yoshihiro Hayashi, Toyota, Japan

[73] Assignee: Kabushiki Kaisha Tokai Rika Denki Seisakusho, Nishikasugai-gun, Aichi Prefecture, Japan

[22] Filed: Nov. 23, 1971

[21] Appl. No.: 201,291

[30] Foreign Application Priority Data

Nov. 24, 1970 Japan..........................45/116605

[52] U.S. Cl..............................242/107.4, 188/135
[51] Int. Cl..........................A62b 35/00, B65h 63/04
[58] Field of Search ........74/530; 188/135, 136, 180; 242/107.3, 107.4

[56] References Cited

UNITED STATES PATENTS 3,237,729   3/1966   Proctor ..............................188/136
3,430,891   3/1969   Burleigh ..........................242/107.4

FOREIGN PATENTS OR APPLICATIONS 1,817,383   7/1969   Germany..........................242/107.4

Primary Examiner—Duane A. Reger
Attorney—Woodhams, Blanchard and Flynn

[57] ABSTRACT

An automatic locking device for a safety belt in a motor car comprising a globe member adapted to move detecting an acceleration of the car and a locking assembly adapted to work according to the motion of the globe member thereby to prevent rotation of a reel shaft of the safety belt instantly when a positive or negative acceleration such as an abrupt brake or collision is applied to the car. In the present device, the motion of the globe member can be remarkably magnified by a magnifying element thereby to effect a rapid and reliable locking operation of the locking assembly.

2 Claims, 6 Drawing Figures

Patented March 27, 1973 3,722,824

INVENTOR
YOSHIHIRO HAYASHI

BY WOODHAMS, BLANCHARD and FLYNN
ATTORNEY

AUTOMATIC LOCKING DEVICE FOR A SAFETY BELT IN A MOTOR CAR

This invention relates to an automatic locking device for a safety belt in a motor car, and more particularly to an automatic locking device for preventing rotation of a reel shaft of the safety belt lest the belt should be loosely drawn out by an inertia of a person's body wearing the belt when a positive or negative acceleration such as an abrupt brake or collision is applied to the motor car.

Heretofore, there has been proposed a locking device for a safety belt comprising a globe member which moves at a positive or negative acceleration of a motor car and an actuating assembly provided directly on the globe member to move in association therewith thereby preventing rotation of a locking gear fixed to a reel shaft of the belt.

However, the locking device of the type as described above has a defect that weight, working resistance, etc. of the actuating assembly itself act on the globe member and weaken an acceleration detecting ability of the globe member. Further, in said conventional locking device, displacement of the globe member to effect the locking operation is so small that an accurate and rapid locking operation cannot be assured.

Therefore, it is an object of the present invention to provide a locking device for a safety belt in a motor car which can transmit a magnified displacement according to an acceleration of the car to a locking assembly thereby ensuring a rapid and reliable locking operation to prevent rotation of the reel shaft.

Essentially, according to the present invention, there is provided an automatic locking device for a safety belt in a motor car which comprises a locking gear fixed to a reel shaft of the safety belt outside a belt case; a swingeable rod extending from the belt case and having a ratchet fixed at its base portion and a sensing element fitted to its free end extendingly therefrom, said ratchet being adapted to engage with said locking gear; a cylindrical case having a seat at its bottom and a pair of cover plates fitted in its upper opening, said pair of cover plates forming in their central portion a ball bearing; a globe member stationed in the center of said seat in an ordinary position and adapted to move on the seat at a positive or negative acceleration of the car; a holding means fitted to said globe member to hangingly hold the same and having a axle extending from its top; a ball held in said ball bearing and having an axle bore, said axle being slidably inserted through said axle bore to extend at its top above said cover plates; a magnifying element mounted on the top of said axle and adapted to rest on the cover plates with its entire circumference in abutment thereon in the ordinary position, said sensing element being placed on said magnifying element in contact therewith.

Various further and more specific objects, features and advantages of this invention will be better understood from the following detailed description, taken in connection with accompanying drawings illustrating by way of example an embodiment, in which.

Figure 1:
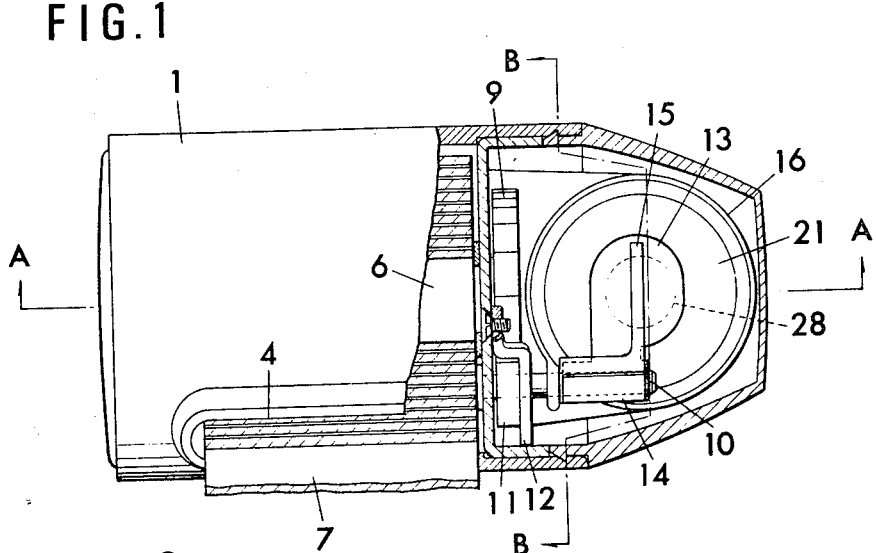
FIG. 1 is a partly cut-away plan view of a locking device for a safety belt embodying the present invention.

Referring now to the drawings, numeral 1 represents a belt case mounted on a designated position in a motor car by a supporting means 5 ordinarily employed in the art. A reel shaft 6 is rotatably supported by a pair of side walls 2 and 3 of the reel case 1 extending therethrough. A belt 7 wound on the reel shaft 6 with its one end fitted thereto is drawn out of an opening 4 of the belt case 1. A coil spring 8 is mounted on the reel shaft 6 outside the side wall 2. To one end of the reel shaft 6 is fixed a locking gear 9 outside the side wall 3.

Numeral 10 represents a swingeable rod supported by the wall 3 and a rod holder 12 in parallel with the reel shaft 6. Said swingeable rod 10 is provided with a ratchet 11 at its base portion adapted to engage with said locking gear 9 for preventing rotation of the reel shaft 6 and a disk-like sensing element 13 at its free end with its top fitted in a socket 14 of the sensing element 13. Said rod is further provided with a spring 15 for pressing said sensing element 13 downward.

Numeral 16 represents a bottomed cylindrical case positioned under the rod with an attachment 17 fixed to the outer face of the side wall 3. The bottom 18 of said cylindrical case 16 having a hollow 19 in its center serves as a seat on which a globe member 25 rests. In an upper opening of said cylindrical case are fitted a cover plate 20 and a toothed auxiliary plate 21 in the central portion of which is formed a ball bearing 22. A ball 23 having an axle bore 24 is slidably held in said ball bearing 22.

Figure 2:
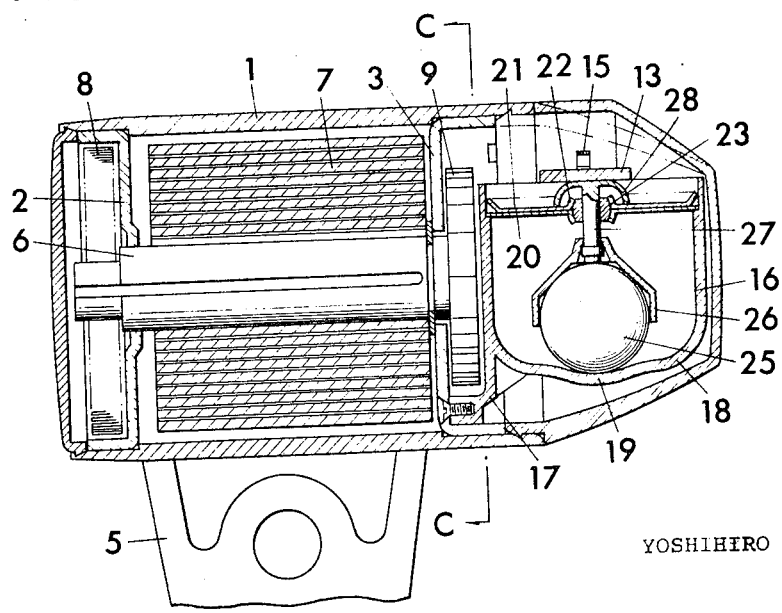
FIG. 2 is a sectional front view taken along the line A — A of FIG. 1.

Numeral 26 is a cup-shaped holding means fitted to an upper semi-circular portion of the globe member 25. An axle 27 extending from said holding means is slidably inserted through the axle bore 24 of the ball 23 and appears above the auxiliary plate 21. To the top of said axle 27 is fixed a bowl-shaped magnifying element 28. In an ordinary position when the globe member stays in the hollow 19 of the seat 18 as seen in FIG. 2, the entire circumference of the magnifying element 28 is adapted to rest in abutment on the auxiliary plate 21.

The aforesaid sensing element 13 is positioned on said magnifying element 28 in contact therewith and keeps the ratchet 11 away from the locking gear according to its state of contact with the magnifying element 28.

Figure 3:
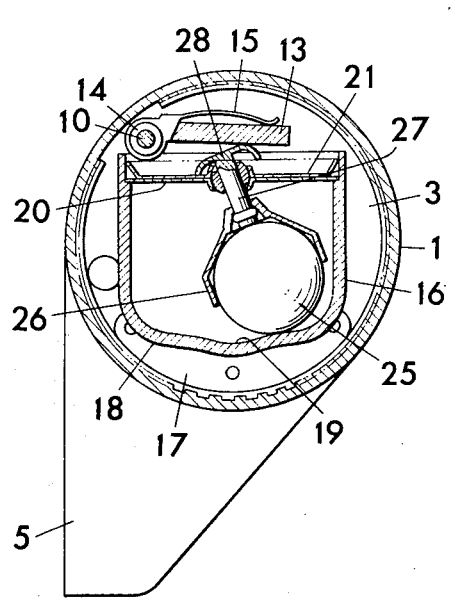
FIG. 3 is a side elevational view of a cross section taken along the line B — B of FIG. 1.
Figure 5:
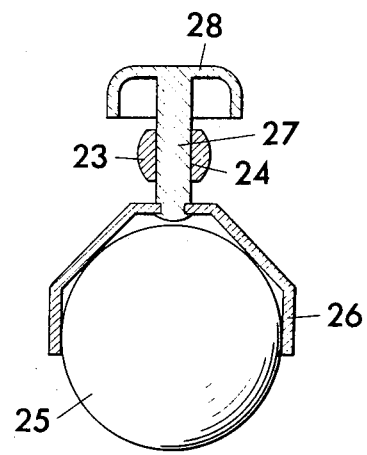
FIG. 5 is an enlarged sectional view showing the holding means and relating members in the present device.
Figure 4:
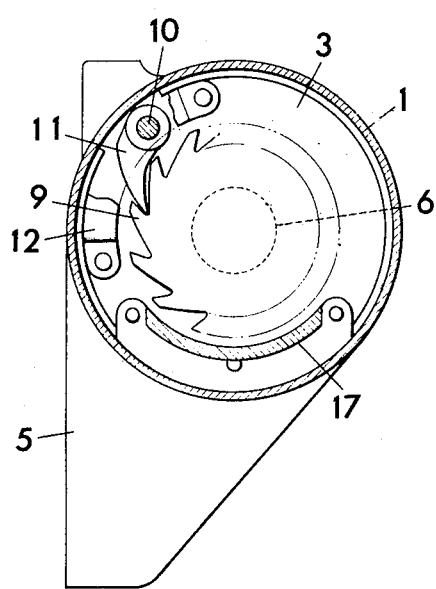
FIG. 4 is a side elevational view of a cross section taken along the line C — C OF FIG. 2.
Figure 6:
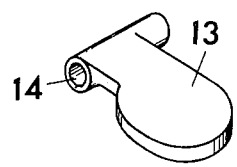
FIG. 6 is a perspective view of a sensing element.

The operation is described as follows;

When an acceleration of the motor car is transmitted to the belt case 1, the globe member 25 detects the acceleration and moves by an inertia on the seat 18 from the center to the circumferential portion as shown in FIG. 3. Then, the cup-shaped holding means 26 moves in association with the globe member 25 and rotates the ball 23 in the ball bearing 22 to lift up the magnifying element 28 on the auxiliary plate 21 in a direction to which the globe member 25 moves. At this moment, a part of the circumference of the element 28 in an opposite direction to the movement of the globe member 25 acts as a fulcrum. The axle 27 also slides in the axle bore 24 on this occasion.

According to the motion of the magnifying element 28 as described the sensing element 13 is also lifted up against the spring 15 to cause a swing of the rod 10 thereby to bring the ratchet 11 into engagement with a tooth of the gear 9. Thus, the reel shaft 6 is instantly locked and the safety belt 7 becomes unable to be drawn out.

As described hereinabove, the globe member 25 which stays on the seat 18 in its center in the ordinary position detects the acceleration of the car and moves toward the circumference in association with the holding means 26 thereby to lift up the magnifying element 28 on the auxiliary plate 21 in accordance with an angle of a swing of the axle 27. In the present invention, the swing motion of the sensing element 13 can be remarkably magnified by the magnifying element 28, and the seat 18 is slanted from the center toward the circumference like an inverted cone to give the globe member 25, a sufficient lifting distance. Therefore, the sensing element 13 is greatly lifted up and the ratchet 11 swings at a large angle to effect a rapid and reliable locking motion of the locking assembly.

What is claimed is:

1. An automatic locking device for a safety belt in a motor car which comprises a locking gear fixed to a reel shaft of the safety belt outside a belt case; a swingable rod extending from the belt case and having a ratchet fixed at its base portion and a sensing element fitted to its free end extendingly therefrom, said ratchet being adapted to engage with said locking gear; a cylindrical case having a seat at its bottom and a pair of cover plates fitted in its upper opening, said pair of cover plates forming in their central portion a ball bearing; a globe member stationed in the center of said seat in an ordinary position and adapted to move on the seat at a positive or negative acceleration of the car; a holding means fitted to said globe member to hangingly hold the same and having an axle extending from its top; a ball held in said ball bearing and having an axle bore, said axle being slidably inserted through said axle bore to extend at its top above said cover plates; a magnifying element mounted on the top of said axle and adapted to rest on the cover plates with its entire circumference in abutment thereof in the ordinary position, said sensing element being placed on said magnifying element in contact therewith.

2. An automatic locking device for a safty belt in a motor car as claimed in claim 1 wherein said seat has a hollow in its central portion and is slanted up from the center toward the circumference thereby to give the globe member a large lifting distance.

* * * * *